(12) United States Patent
Trautmann et al.

(10) Patent No.: US 11,137,072 B2
(45) Date of Patent: Oct. 5, 2021

(54) METHOD FOR OPERATING A TRANSMISSION DEVICE FOR A MOTOR VEHICLE, AND CORRESPONDING TRANSMISSION DEVICE

(71) Applicant: AUDI AG, Ingolstadt (DE)

(72) Inventors: Carsten Trautmann, Wolfsburg (DE); Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 18 days.

(21) Appl. No.: 16/641,343

(22) PCT Filed: Aug. 17, 2018

(86) PCT No.: PCT/EP2018/072357
§ 371 (c)(1),
(2) Date: Feb. 24, 2020

(87) PCT Pub. No.: WO2019/038207
PCT Pub. Date: Feb. 28, 2019

(65) Prior Publication Data
US 2020/0240518 A1 Jul. 30, 2020

(30) Foreign Application Priority Data
Aug. 25, 2017 (DE) ...................... 10 2017 214 905.1

(51) Int. Cl.
*F16H 48/36* (2012.01)
*F16H 63/30* (2006.01)
(Continued)

(52) U.S. Cl.
CPC ........... *F16H 63/304* (2013.01); *B60W 10/08* (2013.01); *B60W 10/115* (2013.01); *F16H 48/11* (2013.01);
(Continued)

(58) Field of Classification Search
CPC .... Y10T 477/23; Y10T 477/26; B60W 10/06; B60W 10/08; B60W 10/115;
(Continued)

(56) References Cited

U.S. PATENT DOCUMENTS 9,327,714 B2 * 5/2016 Pettersson ............ B60W 10/115
2007/0278021 A1 * 12/2007 Pott ....................... B60W 20/10
180/65.285
(Continued)

FOREIGN PATENT DOCUMENTS

DE 10 2009 056 366 A1 6/2011
DE 10 2010 036 240 A1 3/2012
(Continued)

OTHER PUBLICATIONS

English Translation of JP2001039179A; http://translationportal.epo.org; Feb. 1, 2021 (Year: 2021).*
(Continued)

*Primary Examiner* — Roger L Pang
(74) *Attorney, Agent, or Firm* — Maier & Maier, PLLC

(57) ABSTRACT

A transmission device and method for operating a transmission for a motor vehicle, which transmission device has an input shaft which is operatively connectable to a drive device of the motor vehicle, and has a first output shaft and a second output shaft, and has a spur gear differential transmission configured as a planetary transmission, whereby the input shaft and an intermediate shaft are coupled to the first output shaft and the second output shaft. An electric machine is coupled to the input shaft in a first shifting position of the shifting device and to the intermediate shaft in a second shifting position of the shifting device, and the electric machine is operated for applying a torque to the input shaft.

18 Claims, 4 Drawing Sheets

(51) Int. Cl.
  *F16H 48/11* (2012.01)
  *F16H 59/42* (2006.01)
  *B60W 10/08* (2006.01)
  *B60W 10/115* (2012.01)
  *B60W 30/19* (2012.01)
  *B60W 10/06* (2006.01)

(52) U.S. Cl.
  CPC ............ *F16H 48/36* (2013.01); *F16H 59/42* (2013.01); *B60W 10/06* (2013.01); *B60W 30/19* (2013.01); *F16H 2048/364* (2013.01)

(58) Field of Classification Search
  CPC ....... B60W 30/19; B60W 20/10; F16H 48/11; F16H 48/36; F16H 59/42; F16H 2048/364; B60K 2006/4841; B60K 6/48; B60K 6/365; B60K 6/387; B60Y 2400/804
  See application file for complete search history.

(56) References Cited

U.S. PATENT DOCUMENTS

| | | | | |
|---|---|---|---|---|
| 2015/0166047 | A1* | 6/2015 | Pettersson | B60K 6/387 477/3 |
| 2015/0375611 | A1* | 12/2015 | Smetana | B60K 6/365 475/5 |
| 2016/0129784 | A1* | 5/2016 | Wein | F16H 48/36 475/150 |
| 2016/0318419 | A1* | 11/2016 | Gavling | F16H 48/36 |
| 2017/0059023 | A1* | 3/2017 | Severinsson | B60K 17/3462 |
| 2018/0257484 | A1* | 9/2018 | Yamamura | F16H 1/36 |
| 2020/0347917 | A1* | 11/2020 | Trautmann | F16H 3/724 |

FOREIGN PATENT DOCUMENTS

| | | |
|---|---|---|
| DE | 10 2013 202 381 A1 | 8/2014 |
| DE | 10 2013 202 382 A1 | 8/2014 |
| DE | 10 2014 015 793 A1 | 4/2016 |
| DE | 10 2014 016 077 A1 | 5/2016 |
| JP | 2001039179 A | 2/2001 |
| WO | 2016/066732 A1 | 5/2016 |

OTHER PUBLICATIONS

Examination Report dated Feb. 10, 2020 in corresponding German application No. 10 2017 214 905.1; 25 pages including Machine-generated English-language translation.
International Search Report and Written Opinion of the International Searching Authority dated Nov. 20, 2018 in corresponding International application No. PCT/EP2018/072357; 32 pages including Machine-generated English-language translation.
Firsching et al., "48 V hybridization in the drivetrain", MTZ-MTZ—Motor technical magazine, 2017, p. 28035; 14 pages including Machine-generated English-language translation.
Office Action dated May 27, 2020 in corresponding German Application No. 10 2017 214 905.1; 17 pages including partial machine-generated English-language translation.
Notification of Transmittal of Translation of the International Preliminary Report on Patentability dated Mar. 5, 2020, in connection with corresponding international Application No. PCT/EP2018/072357 (8 pgs.).

* cited by examiner

METHOD FOR OPERATING A TRANSMISSION DEVICE FOR A MOTOR VEHICLE, AND CORRESPONDING TRANSMISSION DEVICE

FIELD

The disclosure relates to a method for operating a transmission device for a motor vehicle, which transmission device has an input shaft which is operatively connectable to a drive device of the motor vehicle, and has a first output shaft and a second output shaft, and has a spur gear differential transmission configured as a planetary transmission, whereby the input shaft and an intermediate shaft are coupled to the first output shaft and the second output shaft. This disclosure further relates to a transmission device for a motor vehicle.

BACKGROUND

The transmission device is for example used for transmitting a torque between a drive device of the motor vehicle on the one hand and a wheel axle of the vehicle on the other. The wheel axle is operatively connected or at least operatively connectable to the drive device via the transmission device. The wheel axle is accordingly provided as a driven wheel axle. It can be configured as a front wheel axle or a rear wheel axle of the motor vehicle. The transmission device comprises the input shaft as well as the first output shaft and the second output shaft.

The input shaft of the transmission device is coupled to the drive device of the motor vehicle, preferably via a gearbox and/or a clutch, particularly a start clutch. The gearbox can be used to set a gear ratio selected from multiple gear ratios between the drive device and the input shaft of the transmission device. The clutch is preferably configured as a shift coupling and particularly preferably as a start clutch. The clutch can be used to selectively establish or disconnect the operative connection between the drive device and the transmission device.

The drive device has at least one drive unit, which is for example configured as an internal combustion engine or as an electric machine. The drive device may of course also be present as a hybrid drive device and thus comprise multiple drive units, which preferably are of different types. In this case, one of the drive units can be an internal combustion engine or another of the drive units can be an electric machine, for example. If the drive device has multiple drive units, it is preferably configured such that the drive units, at least temporarily, jointly provide a drive torque which is directed at driving the motor vehicle.

The input shaft of the transmission device is coupled, particularly permanently coupled, to both the first output shaft and the second output shaft via the planetary transmission. The planetary transmission represents a spur gear differential transmission, that is, a differential transmission having multiple intermeshed spur gears. Generally speaking, the spur gear differential transmission works as a differential transmission or differential gear, respectively.

Prior art for example includes document WO 2016/066732 A1. It relates to a transmission device for a motor vehicle, which transmission device has an input shaft that can be operatively connected to a drive unit, a first output shaft, and a second output shaft, wherein the first output shaft is or can be operatively connected to a first partial shaft of a wheel axle via a first transmission and the second output shaft is or can be operatively connected to a second partial shaft of a wheel axle via a second transmission.

SUMMARY

It is the object of the invention to provide a method for operating a transmission device, which method has advantages over known methods, particularly provides high driving power in combination with high driving stability.

An electric machine is coupled to the input shaft in a first shifting position of a shifting device and with the intermediate shaft in a second shifting position of the shifting device, and the electric machine is operated for applying a torque to the input shaft when in the first shifting position and for providing a differential torque and/or differential speed between the first output shaft and the second output shaft when in the second shifting position, wherein the electric machine is operated at a speed different from zero when a differential torque is zero and/or when a differential speed is zero.

Depending on the shifting position of the shifting device, the electric machine can be used both for providing an additional torque at the input shaft and for implementing a torque vectoring functionality. The former is the case if the electric machine is coupled to the input shaft, the latter is the case if it is coupled to the intermediate shaft. If the additional torque is provided at the input shaft, it is superimposed on the drive torque provided by the drive device. The torque provided by the electric machine can be positive or negative, such that the electric machine is ultimately either operated as an electric motor or as a generator.

The shifting device can be used to selectively couple the electric machine to the input shaft or to the intermediate shaft. The shifting device is particularly preferably used to uncouple the electric machine both from the input shaft and from the intermediate shaft, to connect it to the input shaft while it is uncoupled from the intermediate shaft, or to connect it to the intermediate shaft while it is uncoupled from the input shaft. Such a configuration of the shifting device allows a particularly flexible use of the electric machine. The shifting device can for example be positive-locking. A non-positive locking shifting device may also be implemented.

The shifting device allows for setting at least two shifting positions, that is, the first shifting position and the second shifting position. In the first shifting position, the electric machine is coupled in a rotationally fixed manner to the input shaft, in the second shifting position to the intermediate shaft. It is particularly preferred that a third shifting position is provided in which the electric machine is uncoupled from both the input shaft and the intermediate shaft. This configuration allows the flexible use of the electric machine described above. The third shifting position can also be described as an intermediate position.

If the first shifting position of the shifting device is set, the electric machine is operated to apply the torque to the input shaft. But if the second shifting position is set, the differential torque and/or differential speed between the first output shaft and the second output shaft is to be set using the electric machine, particularly a setpoint differential torque. Preferably, a torque directed at driving the motor vehicle can also be provided in the second shifting position using the electric machine. If the second shifting position is set, the electric machine is to drive the motor vehicle in addition to providing the differential torque and/or differential speed. To this end, the electric machine is operated in the second shifting position at a speed different from zero (even) at a differential torque of zero and/or a differential speed of zero.

In another embodiment of the invention, the electric machine is operated in a specific direction of rotation at a speed proportional to the speed of the input shaft before shifting from the first shifting position to the second shifting position. In the first shifting position, the electric machine is used to apply the torque to the input shaft. Its speed is adjusted to that of the input shaft, i.e. it is operated at a speed proportional to the speed of the input shaft. In addition, the electric machine has a specific direction of rotation, which also depends on the direction of rotation of the input shaft. In other words, if the input shaft rotates in a specific first direction of rotation, the electric machine will rotate in a specific first direction of rotation, and if the input shaft rotates in an opposing second direction of rotation, the electric machine will rotate in a second direction of rotation which is different from the first direction of rotation of the electric machine.

In another embodiment of the invention, the electric machine is set to load-free operation when shifting from the first shifting position to the second shifting position or vice versa. This means that the electric machine does not provide a torque but idles along. The electric machine is particularly set such that it has a speed which is still proportional to the speed of the input shaft. Setting the electric machine to load-free operation enables easy shifting of the shifting device.

In a further developed embodiment of the invention, an intermediate position is set at the shifting device when shifting from the first shifting position to the second shifting position or vice versa, in which intermediate position the electric machine is uncoupled from the input shaft and the intermediate shaft, and speed synchronization is performed. In the intermediate position, the electric machine is completely uncoupled from both the input shaft and the intermediate shaft. Accordingly, the speed of the electric machine can in principle be freely selected, particularly independent of the speed of the input shaft and the speed of the intermediate shaft. Speed synchronization of the electric machine can easily be performed in the intermediate position in which the speed of the electric machines is set such that shifting to the first shifting position or the second shifting, respectively, is possible without a speed difference and thus jerk-free.

In another embodiment of the invention, an absolute value of the speed of the electric machine is kept above a minimum speed when shifting from the first shifting position to the second shifting position or vice versa. It was explained above that the electric machine is always operated at a speed proportional to the speed of the input shaft in the first shifting position. In the second shifting position, however, the electric machine runs at a speed which is proportional to the speed of the intermediate shaft. The speed of the electric machine should not vary or at best vary only slightly during shifting between the two shifting positions. Particularly, there should be no significant change in speed of the electric machine, particularly in the form of a reversal of the direction of rotation during which the speed of the electric machine undergoes a zero passage.

Accordingly, the speed of the electric machine, or more precisely its absolute value, is always greater than the minimum speed, which has a positive value. For example, the minimum speed with respect to the speed of the electric machine prior to shifting is at least 50%, at least 60%, at least 70%, at least 75%, at least 80%, or at least 90%. In other words, the speed of the electric machine at best needs a slight adjustment, which otherwise would be very time-consuming. It would be a particular disadvantage if the speed of the electric machine would have to be lowered to zero during shifting and then to be increased again, regardless of whether there is a zero passage of the speed or not.

In another preferred embodiment of the invention, the electric machine is operated in the specific direction of rotation at a speed proportional to the speed of the intermediate shaft after shifting from the first shifting position to the second shifting position. What has been said about the first shifting position applies analogously to operating the electric machine in the second shifting position, however with respect to the speed of the intermediate shaft instead of the speed of the input shaft. We refer to the above statements on this matter. These can be applied analogously.

In another embodiment of the invention a torque of the electric machine which is acting on the input shaft is reduced by a torque difference before shifting from the first shifting position to the second shifting position and the drive device is adjusted to compensate for the torque difference. In the first shifting position, the torque provided by the electric machine is superimposed onto the torque of the drive device applied to the input shaft, such that the electric machine contributes to driving the motor vehicle. This in no longer the case in the second shifting position, such that the additional torque provided at the input shaft by the electric machine is at least partially eliminated and reduces by the torque difference. This torque difference is to be compensated for using the drive device, for which purpose the drive device is adjusted accordingly.

In addition or alternatively, a torque of the electric machine which is acting on the input shaft is increased by a torque difference after shifting from the second shifting position to the first shifting position and the drive device is adjusted to compensate for the torque difference. What has been said about shifting from the first shifting position to the second shifting position applies inversely to shifting from the second shifting position to the first shifting position, and we make reference to the respective statements. When shifting from the second shifting position to the first shifting position, the electric machine can once again contribute a torque to driving the motor vehicle. The torque of the electric machine which is acting on the input shaft increases by the torque difference. The drive device is now set in such a manner that this torque difference is compensated for.

In yet another embodiment of the invention, a low-voltage machine may be used as electric machine. A low-voltage machine particularly includes an electric machine which is connected to the low-voltage network of the motor vehicle. For example, the low-voltage machine is operated at an operating voltage of at most 100 V, preferably at most 50 V, particularly preferably at most 48 V but at least at 24 V, at least at 32 V, or at least at 40 V. To make a mentionable contribution to driving the motor vehicle in the first shifting position, the nominal power of the low-voltage machine preferably is at least 20%, at least 30%, at least 40%, or at least 50% of the nominal power of the drive device. For example, the low-voltage machine has a nominal power of at least 5 kW.

The invention further relates to a method for operating a motor vehicle which comprises a transmission device, that is, preferably a transmission device of the type described above. The motor vehicle, the transmission device, and the method for operating the motor vehicle can be further developed in accordance with the above statements, and we make reference thereto.

The invention in addition relates to a transmission device for a motor vehicle, particularly for performing the method according to the above description, which transmission device has an input shaft which is operatively connectable to a drive device of the motor vehicle, and has a first output shaft and a second output shaft, and has a spur gear differential transmission configured as a planetary transmission, whereby the input shaft and an intermediate shaft are coupled to the first output shaft and the second output shaft.

An electric machine is coupled to the input shaft in a first shifting position of a shifting device and with the intermediate shaft in a second shifting position of the shifting device, and the electric machine is operated for applying a torque to the input shaft when in the first shifting position and for providing a differential torque and/or differential speed between the first output shaft and the second output shaft when in the second shifting position, wherein the electric machine is operated at a speed different from zero when a differential torque is zero and/or when a differential speed is zero.

As to the advantages of such a procedure or such a configuration of the transmission device, we once again make reference to the above description. The transmission device and the method for its operation may once again be further developed as outlined above. The invention also relates to a motor vehicle having such a transmission device.

BRIEF DESCRIPTION OF THE DRAWINGS

The invention will be explained in more detail below based on the exemplary embodiments shown in the drawing, but without limiting the invention in any way. Wherein.

DETAILED DESCRIPTION

Figure 1:
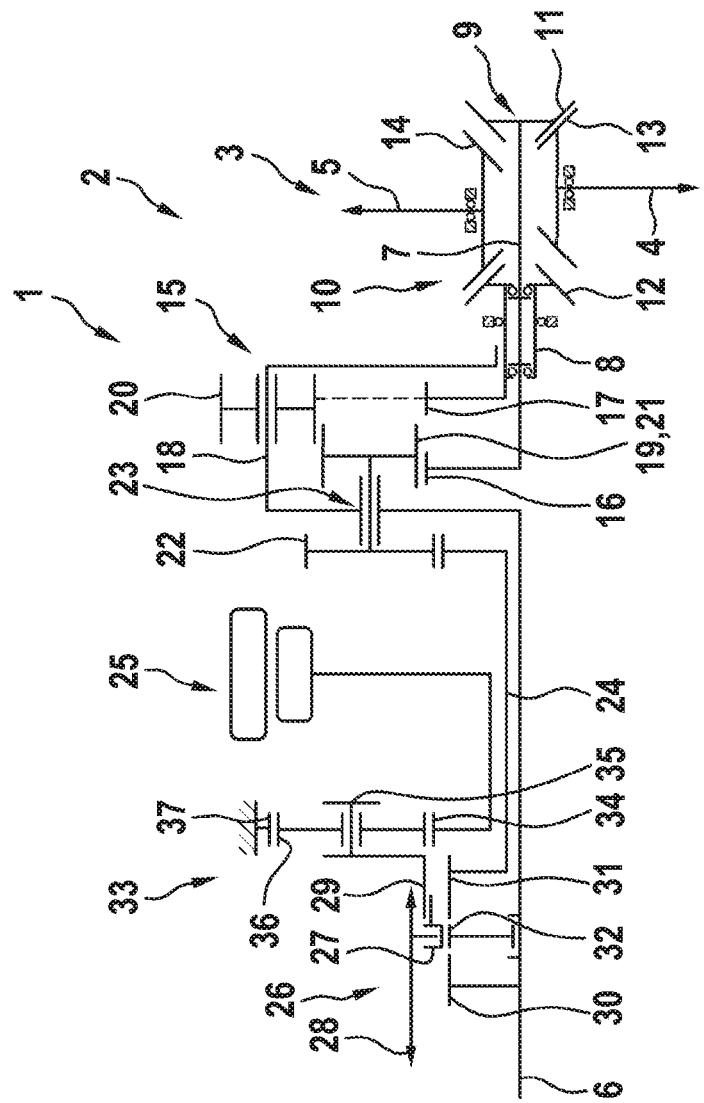
FIG. 1 shows a schematic view of a first embodiment of a transmission device for a motor vehicle.

FIG. 1 shows a schematic view of a first embodiment of a transmission device 1, which is provided herein, for example, as part of a motor vehicle 2 not shown in detail. The motor vehicle 2 has a wheel axle 3 with a first partial shaft 4 and a second partial shaft 5. The wheel axle 3 or the partial shafts 4 and 5, respectively, can be driven by means of the transmission device 1 using a drive device of the motor vehicle 2. The drive device is or at least can be operatively connected to an input shaft 6 of the transmission device 1. The first partial shaft 4, on the other hand, is coupled to a first output shaft 7, the second partial shaft 5 to a second output wave 8 of the transmission device 1, or operatively connected to the output shaft 7 or 8, respectively.

The operative connection between the first partial shaft 4 and the first output shaft 7 is established by means of a first transmission 9, the operative connection between the second partial shaft 5 and the second output shaft 8 is established by means of a second transmission 10. The transmissions 9 and 10 can be provided in the form of angular gears. They are preferably configured as spur gear transmissions and each have a first spur gear 11 or 12, respectively, and a second spur gear 13 or 14, respectively. According to the present embodiment of the transmission device 1, the partial shafts 4 and 5 or their axes of rotation, respectively, can be offset in the lateral or radial direction, respectively, with respect to their axes of rotation. The partial shafts 4 and 5 may alternatively be coaxially arranged, or at least be in alignment in a top view.

The output shafts 7 and 8 may be at an angle with respect to the partial shafts 4 and 5 or the wheel axle 3, i.e. be at an angle greater than 0° and smaller than 180°, for example at an angle of 90° thereto. The respective deflection is implemented by means of the transmissions 9 and 10, which are provided in the form of angular gears. The transmissions 9 and 10 may of course alternatively be configured as spur gear transmissions. For example, the output shafts 7 and 8 are arranged parallel to the partial shafts 4 and 5.

The transmission device 1 comprises a spur gear differential transmission 15, whereby the first output shaft 7 and the second output shaft 8 are permanently operatively connected or coupled to the input shaft 6. To this end, the spur gear differential transmission 15 is configured as a planetary gear which comprises a first sun gear 16, a second sun gear 17, and a planetary carrier 18 on which a first planetary gear 19 and a second planetary gear 20 are each pivotably mounted. The planetary carrier 18 is coupled to the input shaft 6 of the transmission device 1, particularly in a rigid and/or permanent manner. The first sun gear 16, on the other hand, is coupled to the first output shaft 7 and the second sun gear 17 is coupled to the second output shaft 8, preferably in a rigid and/or permanent manner. The first planetary gear 19 meshes with the second planetary gear 20, preferably permanently. The first planetary gear 19 also meshes with the first sun gear 16, but not with the second sun gear 17. The second planetary gear 20 on the other hand meshes with the second sun gear 17, but not with the first sun gear 16.

The first planetary gear 19 is configured as the first stepped planetary gear 21, which is coupled to the second stepped planetary gear 22 in a rotationally fixed manner. The two stepped planetary gears 21 and 22 are jointly pivotably mounted onto the planetary carrier 18, wherein they are preferably provided on opposite sides of a mounting point 23 on the planetary carrier 18. The second stepped planetary gear 22 is coupled to an intermediate shaft 24 in a rotationally fixed manner, particularly in a rigid and/or permanent manner. It is clearly visible that the two output shafts 7 and 8 and the input shaft 6 and intermediate shaft 24 are arranged coaxially, that is, have the same axis of rotation. The second output shaft 8 accommodates at least sections of the first output shaft 7, and likewise the intermediate shaft 24 accommodates at least sections of the input shaft 6. It should be particularly pointed out that the spur gear differential transmission 15 is configured without an internal gear, i.e. does not have an internal gear.

The transmission device 1 has an electric machine 25 which can be coupled to the input shaft 6 and/or to the intermediate shaft 24 by means of a shifting device 26. The shifting device 26 has a coupling member 27 for this purpose, which can be displaced in the axial direction as indicated by the double arrow 28. In the embodiment shown here, the shifting device 26 comprises an input gear 29, a first output gear 30, and a second output gear 31. Furthermore, an auxiliary gear 32 may be provided.

The coupling member 27 is configured such that is permanently meshes with the input gear 29 of the shifting device 26. In a first shifting position, it additionally meshes with the first output gear 30, but not with the second output gear 31 and the auxiliary gear 32. In a second shifting position, it additionally meshes with the second output gear 31, but not with the first output gear 30 and the auxiliary gear 32. In a third shifting position, it additionally meshes with the first output gear 32, but not with the second output gear 30 and the auxiliary gear 31.

The input gear 29 is coupled to the electric machine 25, particularly in a rigid and/or permanent manner. The first output gear 30 is firmly coupled to the input shaft 6, and the second output gear 31 is firmly coupled to the intermediate shaft 24, preferably likewise in a rigid and/or permanent manner. The auxiliary gear 32, on the other hand, is uncoupled from both the input shaft 6 and the intermediate shaft 24 and thus mounted for free rotation.

The connection between the electric machine 25 and the shifting device 26 or the input gear 29, respectively, is provided by means of a coupled planetary transmission 33. It comprises a sun gear 34, a planetary carrier 35 with a planetary gear 36 pivotably mounted thereto, and an internal gear 37. The sun gear is coupled to the electric machine 25, particularly in a rigid and/or permanent manner. The internal gear 37 is stationary, however. The planetary gear 36 now meshes with both the sun gear 34 and the internal gear 37. The planetary carrier 35 is coupled to the shifting device 26, particularly to the input gear 29, particularly in a rigid and/or permanent manner.

The shifting device 26 can be used to couple the electric machine 25 either to the input shaft 6 or to the intermediate shaft 24. In the former case, the electric machine 25 can provide a torque which is superimposed on a torque provided by the drive device to the input shaft 6. This means that the electric machine 25 can be used to either increase or reduce the drive torque.

In the second shifting position of the shifting device 26, the electric machine 25 can be used for providing a torque vectoring functionality. This functionality allows splitting the drive torque applied to the input shaft 6 by providing an additional torque between the two partial shafts 4 and 5 using the electric machine 25, such that a desired torque distribution between these shafts is achieved. This means that the electric machine 25 can be used to split the drive torque freely between the output shafts 7 and 8 and thus between the partial shafts 4 and 5.

Figure 2:
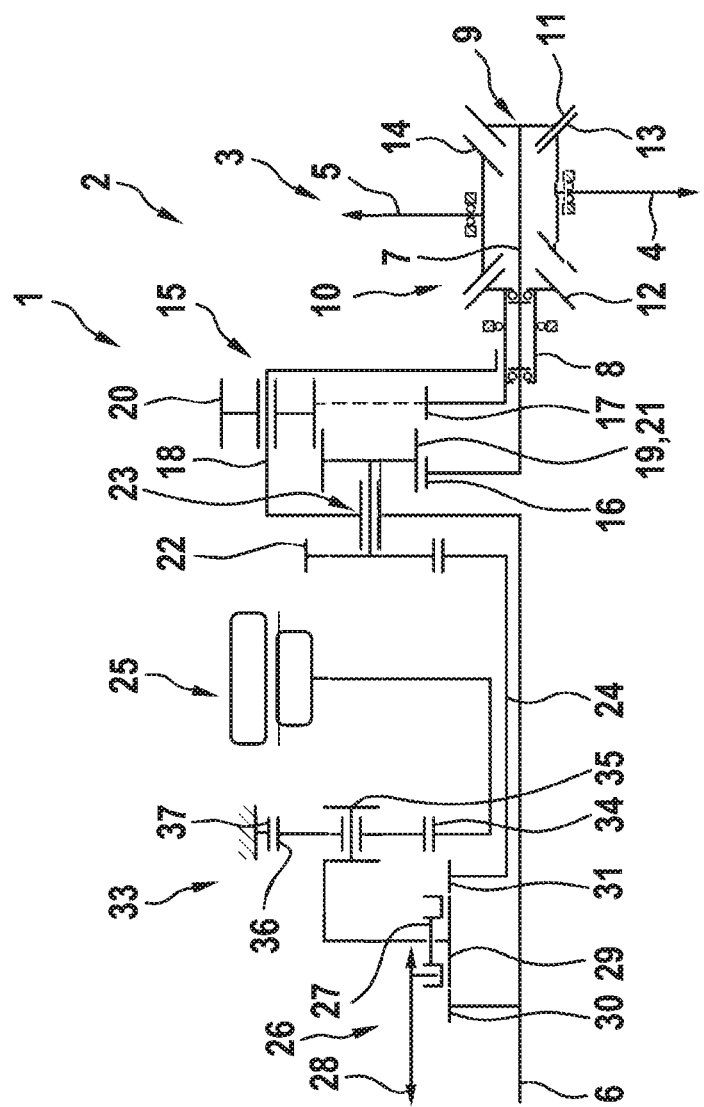
FIG. 2 shows a schematic view of a second embodiment of the transmission device.

FIG. 2 shows a schematic view of a second embodiment of the transmission device 1. It is in principle constructed like the first embodiment, such that we will only discuss the differences hereinafter and otherwise refer to the description above. The differences are in the design of the shifting device 26. While the input gear 29 was configured as an internal gear in the first embodiment, it is now present as a spur gear and is arranged between the first output gear 30 and the second output gear 31 when viewed in an axial direction. The functionality is not identical with the shifting device 26 of the first embodiment described above, however. Compared to that embodiment, the auxiliary gear 32 can be eliminated, which is the case here.

Figure 3:
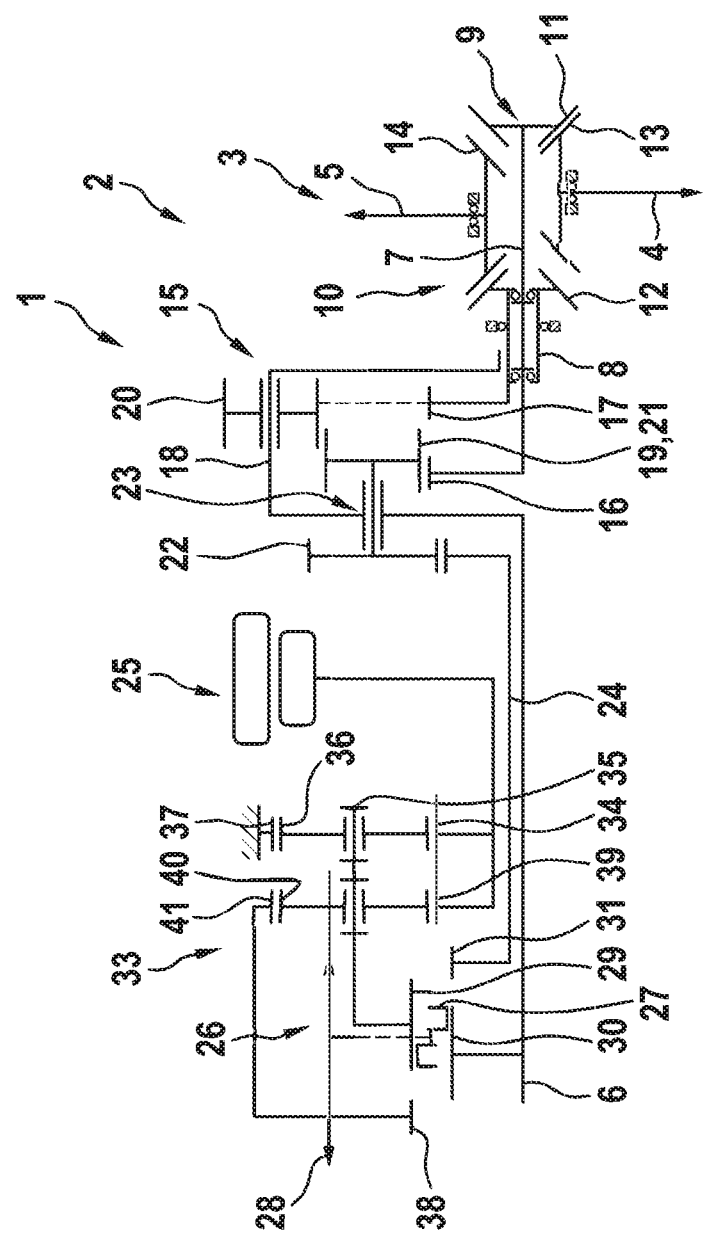
FIG. 3 shows a schematic view of a third embodiment of the transmission device.

FIG. 3 shows a schematic view of a third embodiment of the transmission device 1. Once again we refer to the preceding description, particularly regarding the first embodiment, and will point out the difference below. These differences include that the coupled planetary transmission 33 is two-stage, such that the electric machine 25 is coupled to both the input gear 29 and to another input gear 38 by means of the coupled planetary transmission 33, preferably in a rigid and/or permanent manner. To this end, the coupled planetary transmission 33 comprises another sun gear 39, another planetary gear 40, and another internal gear 41.

The sun gear 39 is coupled to the sun gear 34 and thus to the electric machine 25, particularly in a rigid and/or permanent manner. The planetary gear 40 is pivotably mounted to the planetary carrier 35, but independent of the planetary gear 36. The planetary gear 40 meshes with the sun gear 39 on the one hand and with the internal gear 41 on the other. The internal gear is pivotably mounted and coupled to the input gear 38, preferably in a rigid and/or permanent manner. The planetary gears 36 and 40 preferably comprises different numbers of teeth, such that a first gear ratio is established between the electric machine 25 and the input gear 29 and a second gear ratio is established between the electric machine 25 and the other input gear 38, wherein the two gear ratios are different from each other.

In addition to the shifting positions already described above, a fourth shifting position of the shifting device 26 can be provided in which the coupling member 27 meshes with the input gear 38 instead of the input gear 29, while it meshes at the same time with the first output gear 30. Accordingly, a different gear ratio than in the first shifting position is set here between the electric machine 25 and the input shaft 6.

The described transmission device 1 has the particular advantage that the spur gear differential transmission 15 is configured without an internal gear and can thus be implemented in a small axial installation space. In addition, the shifting device 26 allows a flexible coupling of the electric machine 25 either for driving the input shaft 6 or for providing the torque vectoring functionality by driving the intermediate shaft 24.

The transmission device 1 described above is used to implement a method in which the electric machine 25 is operated for applying a torque to the input shaft 6 when in the first shifting position and for providing a differential torque and/or differential speed between the first output shaft 7 and the second output shaft 8 when in the second position, wherein the electric machine 25 is operated at a speed different from zero when a differential torque is zero and/or when a differential speed is zero. This on the one hand allows improved propulsion of the motor vehicle 2 even in the second shifting position and on the other hand faster shifting between the shifting positions.

Figure 4:
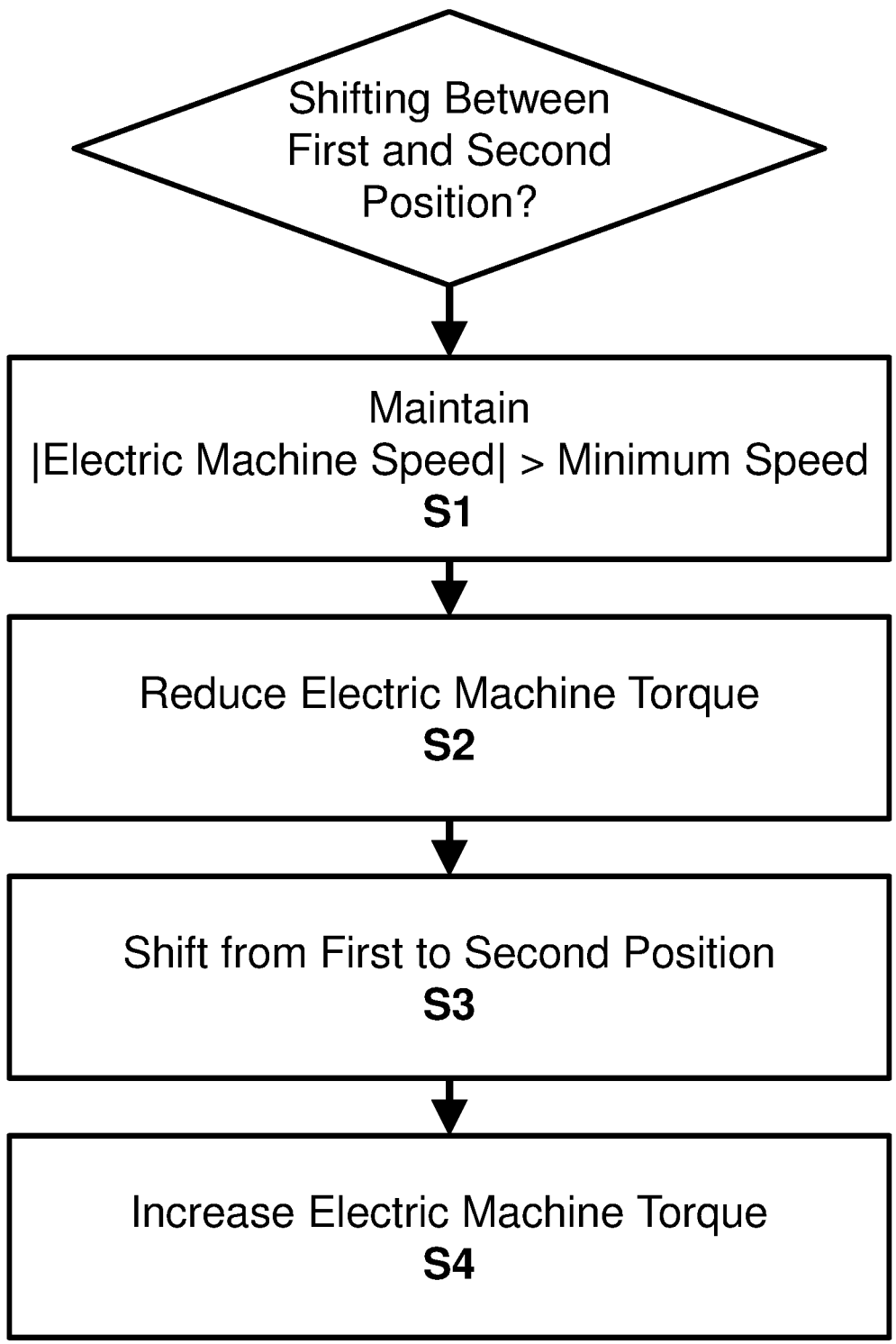
FIG. 4 shows an exemplary process for shifting a transmission device.

FIG. 4 shows a process by which a speed and torque of the electric machine 25 might be managed when shifting the shifting device 26. When shifting from the first shifting position to the second shifting position (or vice versa), an absolute value of the speed of the electric machine 25 is kept above a minimum speed in S1. Before shifting from the first shifting position to the second shifting position in S3, a torque of the electric machine 25 is reduced by a torque difference in S2 and the drive device is adjusted to compensate for the torque difference. After shifting from the first shifting position to the second shifting position in S3, a torque of the electric machine 25 is increased by a torque difference in S4 and the drive device is adjusted to compensate for the torque difference.

The invention claimed is:

1. A method for operating a transmission device for a motor vehicle, the transmission device comprising:
    an input shaft which is operatively connectable to a drive device of the motor vehicle;
    a first output shaft and a second output shaft; and
    a spur gear differential transmission configured as a planetary transmission,
        wherein the input shaft and an intermediate shaft are coupled to the first output shaft and the second output shaft via the spur gear differential transmission,
        wherein the intermediate shaft is formed as a hollow shaft through which the input shaft passes, wherein an electric machine is coupled to the input shaft in a first shifting position of a shifting device and is coupled to the intermediate shaft in a second shifting position of the shifting device, wherein the electric machine is operated for applying a torque to the input shaft when in the first shifting position and for providing a differential torque and/or differential speed between the first output shaft and the second output shaft when in the second shifting position, and wherein the electric machine is operated at a speed different from zero when a differential torque is zero and/or when a differential speed is zero.

2. The method according to claim 1, wherein, before shifting from the first shifting position to the second shifting position, the electric machine is operated in a specific direction of rotation at a speed proportional to the speed of the input shaft.

3. The method according to claim 1, wherein the electric machine is set to load-free operation when shifting from the first shifting position to the second shifting position, or vice versa.

4. The method according to claim 1, wherein an intermediate position is set at the shifting device when shifting from the first shifting position to the second shifting position, or vice versa, in which intermediate position the electric machine is uncoupled from the input shaft and the intermediate shaft, and speed synchronization is performed.

5. The method according to claim 1, wherein an absolute value of the speed of the electric machine is kept permanently above a minimum speed when shifting from the first shifting position to the second shifting position, or vice versa.

6. The method according to claim 1, wherein, after shifting from the first shifting position to the second shifting position, the electric machine is operated in a specific direction of rotation at a speed proportional to the speed of the intermediate shaft.

7. The method according to claim 1, wherein, before shifting from the first shifting position to the second shifting position, a torque of the electric machine which is acting on the input shaft is reduced by a torque difference and the drive device is adjusted to compensate for the torque difference.

8. The method according to claim 1, wherein, after shifting from the second shifting position to the first shifting position, a torque of the electric machine which is acting on the input shaft is increased by a torque difference and the drive device is adjusted to compensate for the torque difference.

9. The method according to claim 1, wherein a low-voltage machine is used as the electric machine.

10. The method according to claim 1, wherein the planetary transmission of the spur gear differential transmission is configured as a double planetary gearing comprising a first and a second sun gear, a first and a second planetary gear, and a common planetary gear carrier.

11. The method according to claim 10, wherein the first planetary gear is formed as a stepped planetary gear which meshes on a first side with the second planetary gear and the first output shaft, and meshes on a second side with the intermediate shaft.

12. The method according to claim 10, wherein the input shaft rotates with the common planetary gear carrier.

13. The method according to claim 10, wherein the planetary gearing lacks an internal gear.

14. A transmission device for a motor vehicle, comprising:

an input shaft which is operatively connectable to a drive device of the motor vehicle;

a first output shaft and a second output shaft; and a spur gear differential transmission configured as a planetary transmission, wherein the input shaft and an intermediate shaft are coupled to the first output shaft and the second output shaft via the spur gear differential transmission, wherein the intermediate shaft is formed as a hollow shaft through which the input shaft passes, wherein an electric machine is coupled to the input shaft in a first shifting position of a shifting device and is coupled to the intermediate shaft in a second shifting position of the shifting device, wherein the electric machine is operated for applying a torque to the input shaft when in the first shifting position and for providing a differential torque and/or differential speed between the first output shaft and the second output shaft when in the second shifting position, and wherein the electric machine is operated at a speed different from zero when a differential torque is zero and/or when a differential speed is zero.

15. The transmission device according to claim 14, wherein the planetary transmission of the spur gear differential transmission is configured as a double planetary gearing comprising a first and a second sun gear, a first and a second planetary gear, and a common planetary gear carrier.

16. The transmission device according to claim 15, wherein the first planetary gear is formed as a stepped planetary gear which meshes on a first side with the second planetary gear and the first sun gear, which is rigidly connected to the first output shaft, and meshes on a second side with the intermediate shaft.

17. The transmission device according to claim 15, wherein the input shaft rotates with the common planetary gear carrier.

18. The transmission device according to claim 15, wherein the planetary gearing lacks an internal gear.

* * * * *